(12) United States Patent
Ozaki et al.

(10) Patent No.: US 8,046,330 B2
(45) Date of Patent: Oct. 25, 2011

(54) IMAGE ACCUMULATION DEVICE AND IMAGE ACCUMULATION METHOD

(75) Inventors: Hiroshi Ozaki, Tokyo (JP); Katsuo Ogura, Tokyo (JP); Kazuhiro Mino, Kanagawa (JP)

(73) Assignee: FUJIFILM Corporation, Kanagawa (JP)

( * ) Notice: Subject to any disclaimer, the term of this patent is extended or adjusted under 35 U.S.C. 154(b) by 1813 days.

(21) Appl. No.: 10/986,442

(22) Filed: Nov. 12, 2004

(65) Prior Publication Data

US 2005/0151843 A1    Jul. 14, 2005

(30) Foreign Application Priority Data

Nov. 11, 2003 (JP) ................................. 2003-381328

(51) Int. Cl.
*G06F 7/00* (2006.01)
*G06F 17/00* (2006.01)
*G06F 17/30* (2006.01)
(52) U.S. Cl. ......... 707/639; 707/610; 707/803; 348/143
(58) Field of Classification Search .................. 707/610, 707/639, 803; 348/143
See application file for complete search history.

(56) References Cited

U.S. PATENT DOCUMENTS

| | | | |
|---|---|---|---|
| 5,870,741 A * | 2/1999 | Kawabe et al. ........................ 1/1 |
| 5,915,038 A * | 6/1999 | Abdel-Mottaleb et al. ... 382/209 |
| 6,437,797 B1 * | 8/2002 | Ota ................................ 345/638 |
| 6,999,936 B2 * | 2/2006 | Sehr .................................... 705/5 |
| 2002/0049728 A1 * | 4/2002 | Kaku ................................ 707/1 |
| 2002/0075322 A1 * | 6/2002 | Rosenzweig et al. .......... 345/835 |
| 2003/0069893 A1 * | 4/2003 | Kanai et al. ................. 707/104.1 |
| 2004/0183918 A1 * | 9/2004 | Squilla et al. ............... 348/211.2 |

FOREIGN PATENT DOCUMENTS

JP   10-233985 A   9/1998
JP   2002-29422 A  1/2002

* cited by examiner

*Primary Examiner* — Syling Yen
*Assistant Examiner* — Azam Cheema
(74) *Attorney, Agent, or Firm* — Sughrue Mion, PLLC

(57) ABSTRACT

An image accumulation device is provided so as to include: an input unit that inputs, as input images, images of specific shot locations; an image database in which specific locations in a predetermined region, shot images relating to the specific locations, position information of the shot locations of the shot images and shooting time information of the shot images are associated and stored; and an identification unit that identifies, on the basis of the input images and the image database, at least one of specific locations corresponding to the shot locations of the input images and shooting times of the input images.

24 Claims, 10 Drawing Sheets

| LINE NAME | STATION NAME | IMAGE DATA ADDRESS | REPRESENTATIVE OBJECT IMAGE ADDRESS | SHOT LOCATION COORDINATES | PERIPHERAL REGION COORDINATES | SHOOTING DATE |
|---|---|---|---|---|---|---|
| ●● LINE | A STATION | a000h | b000h | (x0,y0) | (x11~x15,y11~y17) | 1975 |
| ●● LINE | A STATION | a100h | b100h | (x1,y1) | (x11~x15,y11~y17) | 2001.3.25 |
| ●● LINE | B STATION | a200h | b200h | (x2,y2) | (x21~x25,y21~y27) | 1983.8.20 |
| ●● LINE | C STATION | a300h | b300h | (x3,y3) | (x31~x35,y31~y37) | 1965 |
| ×× LINE | G STATION | a400h | b400h | (x4,y4) | (x41~x45,y41~y47) | 1993.7 |
| : | : | : | : | : | : | : |
| □□ LINE | Y STATION | a800h | b800h | (x8,y8) | (x81~x85,y81~y87) | 2003.8.8 |
| □□ LINE | Z STATION | a900h | b900h | (x9,y9) | (x91~x95,y91~y97) | 2000.1.20 |

F I G. 3

| LINE NAME | STATION NAME | IMAGE DATA ADDRESS | REPRESENTATIVE OBJECT IMAGE ADDRESS | SHOT LOCATION COORDINATES | PERIPHERAL REGION COORDINATES | SHOOTING DATE |
|---|---|---|---|---|---|---|
| ●● LINE | A STATION | a000h | b000h | (x0, y0) | (x11~x15, y11~y17) | 1975 |
| ●● LINE | A STATION | a100h | b100h | (x1, y1) | (x11~x15, y11~y17) | 2001.3.25 |
| ●● LINE | B STATION | a200h | b200h | (x2, y2) | (x21~x25, y21~y27) | 1983.8.20 |
| ●● LINE | C STATION | a300h | b300h | (x3, y3) | (x31~x35, y31~y37) | 1965 |
| ×× LINE | G STATION | a400h | b400h | (x4, y4) | (x41~x45, y41~y47) | 1993.7 |
| ... | | | | | | |
| □□ LINE | Y STATION | a800h | b800h | (x8, y8) | (x81~x85, y81~y87) | 2003.8.8 |
| □□ LINE | Z STATION | a900h | b900h | (x9, y9) | (x91~x95, y91~y97) | 2000.1.20 |

IMAGE ACCUMULATION DEVICE AND IMAGE ACCUMULATION METHOD

CROSS-REFERENCE TO RELATED APPLICATION

This application claims priority under 35 USC 119 from Japanese Patent Application No. 2003-381328, the disclosure of which is incorporated by reference herein.

BACKGROUND OF THE INVENTION

1. Field of the Invention

The present invention relates to an image accumulation device and an image accumulation method, and in particular to an image accumulation device and an image accumulation method that accumulate images of specific locations, such as stations on transportation lines like railway lines.

2. Description of the Related Art

Conventionally, technology has been proposed where, using images shot with a digital camera to which a Global Positioning System (GPS) device is connected, desired map data are read, on the basis of GPS information such as position information and time information obtained by the GPS device, from a storage medium storing map data, an electronic map including the shot locations of the shot images is displayed on a monitor, and the shot images are efficiently categorized (e.g., see Japanese Patent Application Laid-Open Publication (JP-A) No. 10-233985).

Also, JP-A No. 2002-29422 discloses a measurement data processing device for the maintenance of railway lines. With this device, technology has been proposed where a railway line map is displayed, a measurement point included in a region designated by a pointing device or cursor is determined on the railway line map, and a transportation line zone map and measurement data corresponding to the determined measurement point are displayed.

Railway companies providing daily transportation to people have come to release, to people living in railway areas and new cities developed together with the growth of transportation facilities, photographs recording/preserving the changing aspects of scenery around stations of those railways from the past to the present, in order to promote business services offered by business entities or with the aim or promoting local revitalization by publicizing, to the outside, the distinctive characteristics of those railway areas and cities. In this manner, by releasing such photographs to local inhabitants without confuting the photographs to creating a history of the railway companies, it is possible to encourage the local inhabitants to have a feeling of identity with those areas, and therefore to have a feeling of attachment to their home. For this reason, image accumulation devices that can be used for various purposes, such as accumulating images of stations on railway lines shot from the past to the present and displaying the accumulated image amounts of each station according to era, are expected. By using such an image accumulation device to collectively manage the images shot from the past to the present, it becomes possible for railway companies to use the images, for example, to create local histories of the railway lines, compile a company history, or use the images in events such as events celebrating the anniversary of the development of a new city.

However, the technology disclosed in JP-A No. 10-233985 displays thumbnail images at the positions of the shot locations of the images, and the technology disclosed in JP-A No. 2002-29422 displays measurement data of measurement points on transportation lines. Neither technology can be used for purposes such as displaying images of areas around stations on railway lines according to era or displaying the accumulated image amounts thereof.

SUMMARY OF THE INVENTION

The present invention has been made in view of the above circumstances, and it is to provide an image accumulation device and an image accumulation method that can accumulate images in which areas of stations on railway lines or the like are shot, determine the accumulated image amount of each station, and output this in a manner that is easily recognizable.

A first aspect of the invention provides an image accumulation device including: an input unit that inputs, as input images, images of specific shot locations; an image database in which specific locations in a predetermined region, shot images relating to the specific locations, position information of shot locations of the shot images and shooting time information of the shot images are associated and stored; and an identification unit that identifies, on the basis of the input images and the image database, at least one of specific locations corresponding to the shot locations of the input images and shooting times of the input images.

According to this aspect, the image accumulation device is disposed with an image database in which specific locations in predetermined regions, shot images relating to the specific locations, position information of shot locations of the shot images and shooting time information of the shot images are associated and stored. Here, "predetermined regions" means regions including plural locations associated with predetermined conditions such as regions on transportation lines. Further, "transportation lines" means railway lines and bus lines or the like, and "specific locations" means stations and bus stops or the like.

The image accumulation device may further include a registration unit that associates the input images with at least one of the specific locations and the shooting times identified by the identification unit and registers these in the image database.

The image accumulation device may further include: a calculation unit that calculates, for each specific location in the predetermined region, accumulated image amounts of the shot images registered in the image database; a generation unit that generates an accumulated image amount display image showing the accumulated image amounts of each specific location in the predetermined region calculated by the calculation unit; and an output unit that outputs the accumulated image amount display image.

The calculation unit calculates, for each specific location on the transportation lines, accumulated image amounts of the shot images registered in the image database, and the generation unit generates an accumulated image amount display image showing the accumulated image amounts of each specific location on the transportation lines from the calculation result.

The output unit can be disposed with a display unit that displays the accumulated image amount display image) a printing unit that prints out the accumulated image amount display image, or a recording unit that records, in a recording medium, the accumulated image amount display image or the like.

A second aspect of the invention provides an image accumulation method including: receiving, from the outside as input images, images shot of specific shot locations; associating and storing, in an image database, specific locations in a predetermined region, shot images relating to the specific locations, position information of shot locations of the shot images and shooting time information of the shot images; and identifying, on the basis of the input images and the image database, at least one of specific locations corresponding to the shot locations of the input images and shooting times of the input images.

According to this aspect, the image accumulation method including associating and storing, in an image database, specific locations in predetermined regions, shot images relating to the specific locations, position information of shot locations of the shot images and shooting time information of the shot images. Here, "predetermined regions" means regions including plural locations associated with predetermined conditions such as regions on transportation lines. Further, "transportation lines" means railway lines and bus lines or the like, and "specific locations" means stations and bus stops or the like.

The image accumulation method may further include: associating the input images with at least one of the specific locations and the shooting times identified and registering these in the image database.

The image accumulation method may further include: calculating, for each specific location in the predetermined region, accumulated image amounts of the shot images registered in the image database; generating an accumulated image amount display image showing the accumulated image amounts calculated for each specific location in the predetermined regions; and outputting the accumulated image amount display image.

In this manner, in the present invention, shot images relating to specific locations in predetermined regions are associated with specific locations and stored, the accumulated image amount of each specific location is determined, and an accumulated image amount display image is displayed and outputted. Thus, the shot images can be classified per specific location, the accumulated image amount of each specific location can be easily known, and images shot from the past to the present can be collectively managed.

BRIEF DESCRIPTION OF THE DRAWINGS

FIG. 3 is a table showing the schematic configuration of management data in the image database;

DETAIL DESCRIPTION OF THE INVENTION

An example of an embodiment of the invention will be described in detail below with reference to the drawings. In this embodiment, a case will be described where the invention is applied to railway lines.

Figure 1:
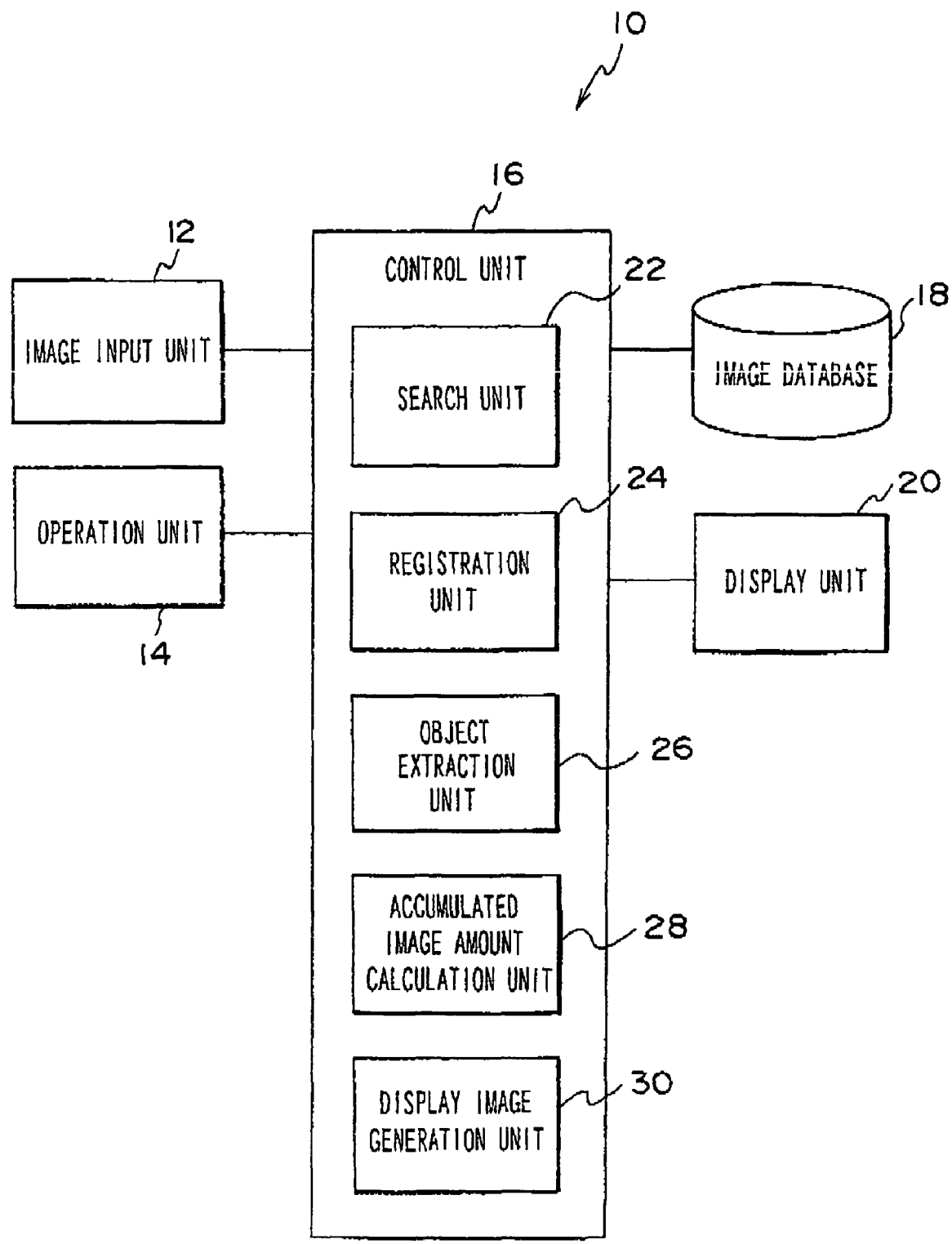
FIG. 1 is a block diagram of an image accumulation device of an embodiment of the present invention.

FIG. 1 shows a schematic block diagram of an image accumulation device 10 pertaining to the invention. As shown in FIG. 1, the image accumulation device 10 is configured so as to include an image input unit 12, an operation unit 14, a control unit 16, an image database 18 and a display unit 20.

The image input unit 12 is for inputting shot images of specific shot locations. For example, a scanner that irradiates, with light, a reflective document such as a photographic print and reads the reflected light to obtain an image of the document can be used.

The image input unit 12 is not limited to a scanner; it suffices as long as the image input unit 12 can input an image. For example, a film scanner that reads a transmissive document such as photographic film, a card reader for reading digital images recorded in a recording medium such as a memory card, a drive device for reading digital images recorded on a CD or DVD, and an interface device that receives digital images transferred over a network can be used.

The operation unit 14 is configured so as to include a keyboard and a mouse, and is for conducting various kinds of operations, such as selecting a later described transportation line map, in accordance with a display screen displayed on the display unit 20.

The control unit 16 controls the entire image accumulation device 10 and each unit connected to the control unit 16, and is configured so as to include a search unit 22, a registration unit 24, an object extraction unit 26, an accumulated image amount calculation unit 28 and a display image generation unit 30.

Figure 2:
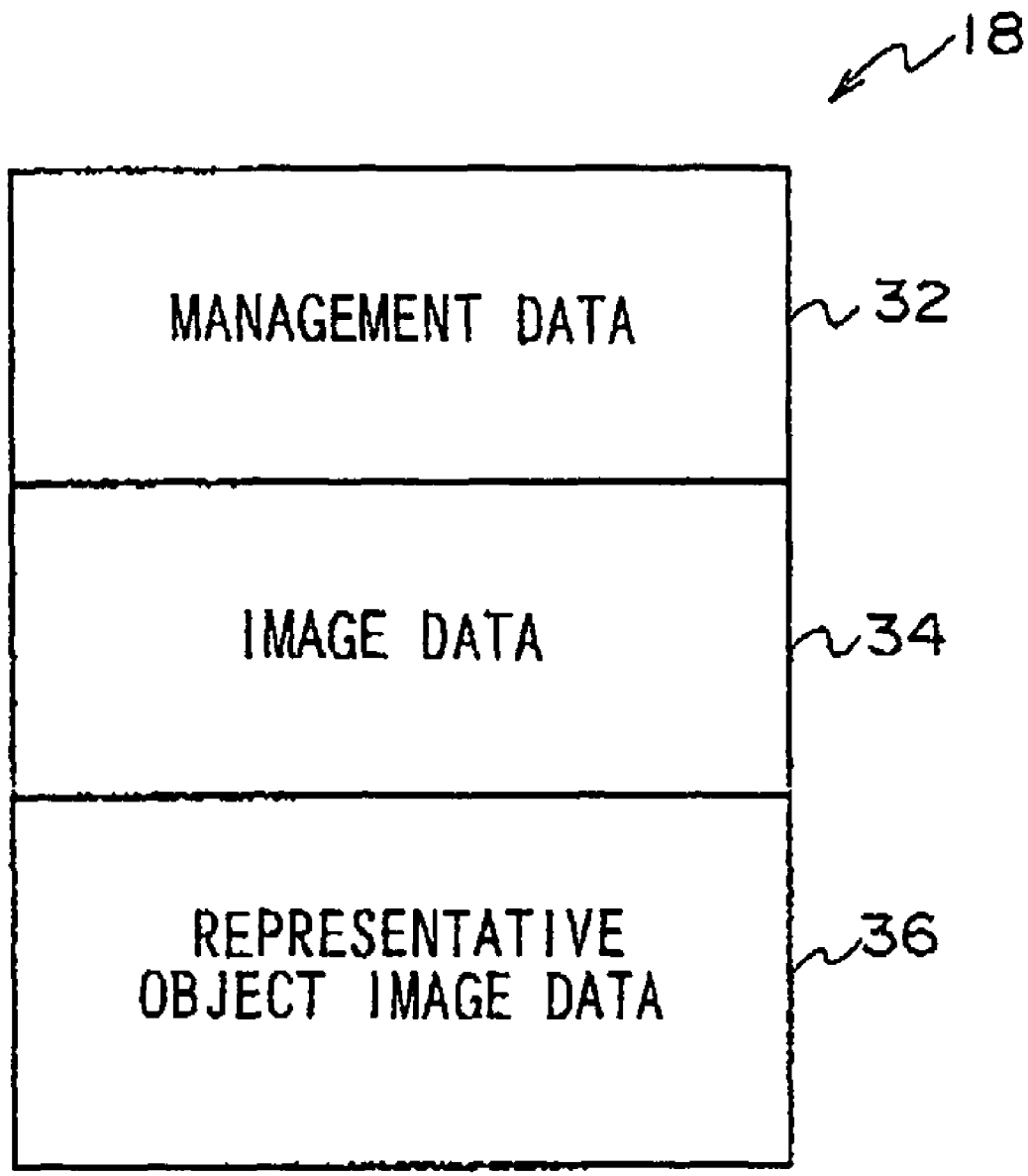
FIG. 2 is a diagram showing storage areas of data in an image database of the embodiment.

As shown in FIG. 2, the image database 18 comprises a management data area 32, an image data area 34 and a representative object image data area 36. Management data are stored in the management data area 32, image data are stored in the image data area 34, and representative object image data are stored in the representative object image data area 36. The representative object image data are image data of representative objects included in images represented by image data. Image data in regard to each station on each transportation line where shot locations are identified are preregistered in the image database 18.

As shown in FIG. 3, the management data are configured so as to include information such as railway line names, station names, image data addresses of shot images of station peripheries, representative object image addresses of shot images, coordinates of shot locations, peripheral region coordinates representing peripheral regions of stations, and shooting dates. The shot images of station peripheries include images in which the stations themselves are shot and images shot in the areas around those stations. Also, the coordinates of the shot locations are represented by, for example, longitude and latitude. The peripheral regions are set by rectangular regions or circular regions, but are not limited to these. The shooting dates may be information specified simply by years without specific dates, or may be information specified by periods.

The search unit 22 searches the image database 18 to determine if the shot location of an input image inputted by the image input unit 12 corresponds to that of an image shot in the area of a particular station.

Specifically, in a case where the input image is of a format where, as in the Exchangeable image file format (Exif format), which is becoming more common as the format of images shot with a digital camera, incidental information (tag data) including information relating to position information of the shot location and the shooting time such as the shooting data is added to the shot image, the search unit 12 compares the coordinates of the shot location represented by the position information of the shot location included in the incidental information with the peripheral region coordinates included in the management data of the image database 18, and determines that the image is an image shot in the station periphery corresponding to the coordinates of that peripheral region when the shot location of the input image is present in the peripheral region represented by the peripheral region coordinates included in the management data of the image database 18.

Also, in a case where the input image is of a format in which incidental information has not been added, an object is extracted from the input image by the object extraction unit 26, and the search unit 12 compares the extracted object with the representative object images represented by the representative object image data registered in the image database 18, and determines that the image is an image shot in the station periphery corresponding to that representative object image when something that is similar is present. Thus, it becomes possible to identify the shot location even when incidental information representing the coordinates of the shot location is not included in the input image.

The registration unit 24 registers, in the image database 18, input images whose shot locations were able to be identified, the extracted representative object images, and the incidental information.

The accumulated image amount calculation unit 28 calculates, from the image database 18, the accumulation amounts of images of each station on the railway line selected by the user.

The display image generation unit 30 generates display images of various kinds of screens to be displayed on the display unit 20 such as a line selection screen for selecting a transportation line and screens representing the accumulated image amount in regard to each station on the selected railway line, and outputs these display images to the display unit 20.

Figure 4:
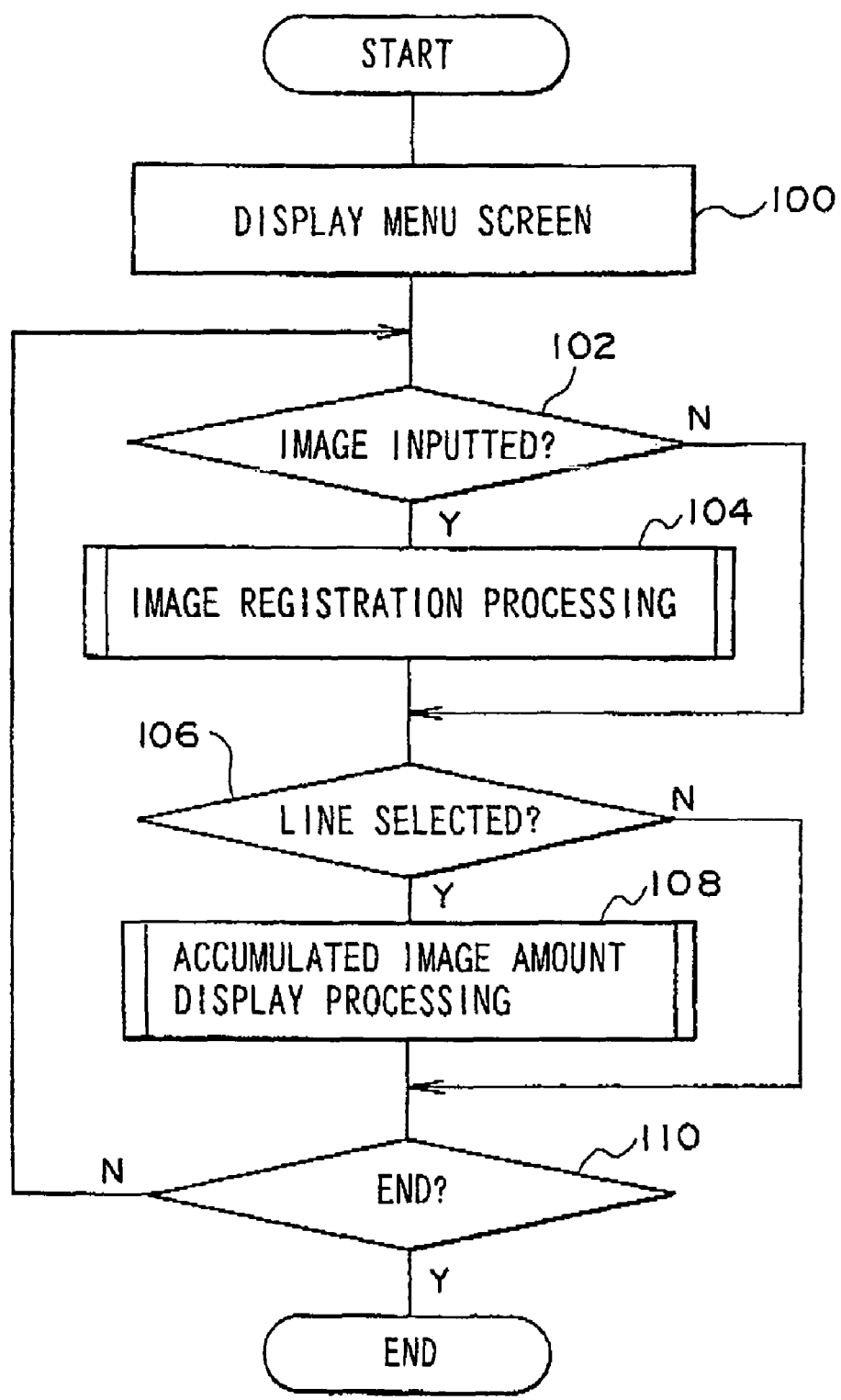
FIG. 4 is a flow chart of a main routine executed by a control unit of the accumulation device of the embodiment.

Next, a processing routine executed by the control unit 16 will be described as the operation of the present embodiment with reference to the flow charts shown in FIGS. 4 to 6.

Figure 7:
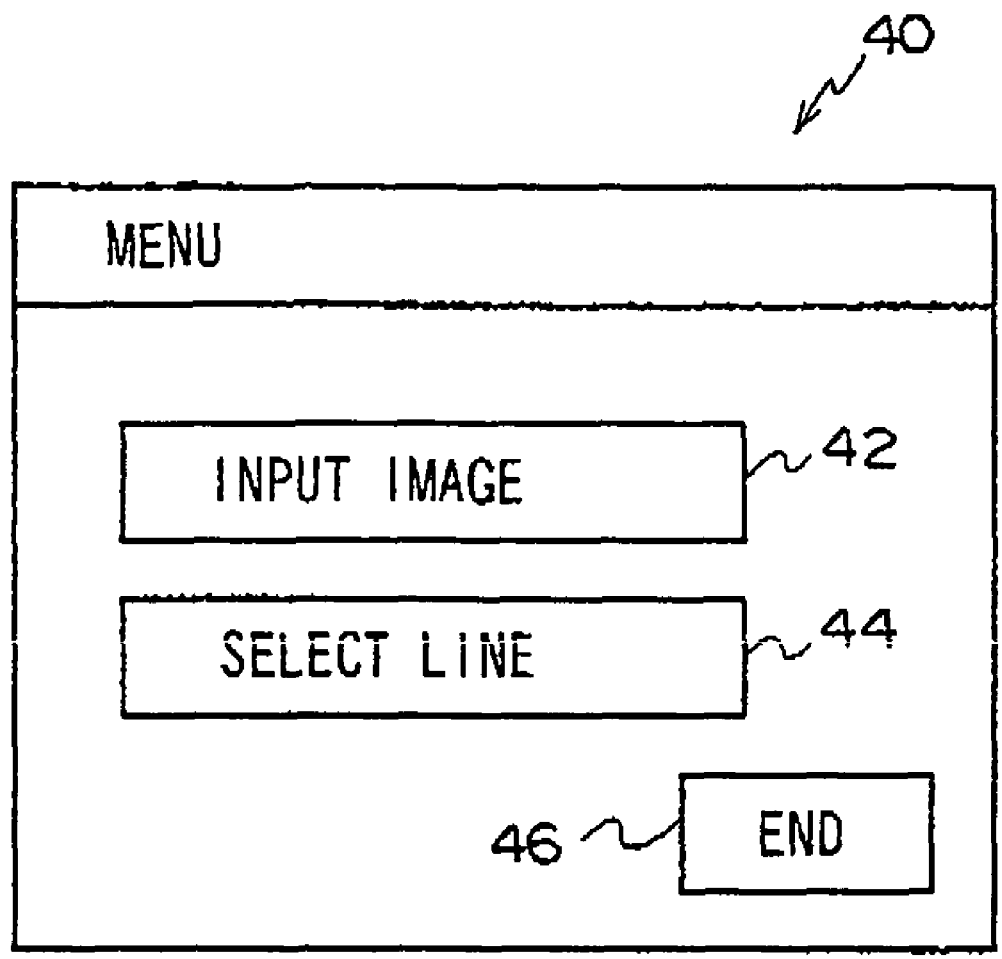
FIG. 7 is a diagram showing an example of a menu screen according to the embodiment.

First, a main routine will be described with reference to the flow chart shown in FIG. 4. In step 100, the display image generation unit 30 generates an image of a menu screen 40 such as shown in FIG. 7, and outputs this image to the display unit 20. Thus, the menu screen 40 is displayed on the display unit 20.

As shown in FIG. 7, the menu screen 40 is a screen where an image input button 42, which is to be selected when the user wants to input an image that the user wants to register in the image accumulation device 10, a line selection button 44, which is to be selected when the user wants to select a transportation line whose accumulated image amount the user wants to be displayed, and an END button 46, which is to be selected when the user wants to end the routine, are displayed. The user can select these buttons by operating the operation unit 14.

In step 102, it is determined whether or not the image input button 42 has been selected. When it is determined that the image input button 42 has been selected, the main routine moves to step 104, where the image registration processing shown in FIG. 5 is executed. When it is determined that the image input button 42 has not been selected, the main routine moves to step 106.

In step 106, it is determined whether or not the line selection button 44 has been selected. When it is determined that the line selection button 44 has been selected, the main routine moves to step 108, where the accumulated image amount display processing routine shown in FIG. 6 is executed. When it is determined that the line selection button 44 has not been selected, the main routine moves to step 110.

In step 110, it is determined whether or not the END button 46 has been selected. When it is determined that the END button 46 has been selected, the main routine ends. When it is determined that the END button 46 has not been selected, the main routine returns to step 102 and the same processing as described above is conducted.

Next, the image registration processing will be described with reference to the flow chart shown in FIG. 5. In step 200, image input processing is conducted. Specifically, if, for example, the image input unit 12 is configured by a scanner, the user sets a document and conducts an operation for executing reading, reading of the document starts, and the read image is inputted to the control unit 16. If, for example, the image input unit 12 is configured by a card reader for reading digital images recorded in a recording medium such as a memory card, the user sets the memory card in which the images are recorded and conducts an operation for selecting an image file that the user wants to register, whereby the image data are inputted to the control unit 16.

In step 202, the object extraction unit 26 extracts a representative object from the image inputted from the image input unit 12. For example, when plural objects are included in the image, the object extraction unit 26 extracts, as the representative object, an object of a predetermined class (e.g., buildings) from those objects. Various kinds of conventionally known methods can be used for the object extraction. Further, for example, the techniques described in Japanese Patent Application Nos. 2002-221300 and 2002-221302, which were filed by the applicant of the present application, can be also used. Thus, the object class can be precisely identified.

In step 204, it is determined whether or not incidental information including various information relating to the circumstance of the shooting time such as the position information of the shot location has been added to the inputted image data. When it is determined that incidental information has been added, the routine moves to step 206, and when it is determined that incidental information has not been added, the routine moves to step 210.

In step 206, the search unit 22 sequentially compares the coordinates represented by the position information of the shot location included in the incidental information with the peripheral region coordinates included in the records of the management data in the image database 18, and searches for a record in which the shot location included in the incidental information is included in the peripheral region represented by the peripheral region coordinates of the management data. In other words, the search unit 22 determines whether or not the inputted image is an image shot in one of the areas of the stations on the transportation lines that are the display targets of the accumulated image amounts. Then, when it is determined that a record in which the shot location included in the incidental information is included in the peripheral region represented by the peripheral region coordinates is present in the image database 18, the search unit 22 determines that the shot location of the inputted image is in the area of a station represented by a station name in that record, and identifies the station as the station corresponding to the input image.

In step 210, because it has been determined that incidental information has not been added to the inputted image, the search unit 22 calculates the degree of similarity between the representative object image extracted in step 202 and the registration object images registered in the image database 18, and sequentially searches for a record where the degree of similarity is equal to or greater than a predetermined threshold. Then, when a record is present where the degree of similarity is equal to or greater than the predetermined threshold, the search unit 22 identifies the shot location of that record as the shot location of the input image. Conventionally known methods can be used to determine the degree of similarity. Further, for example, the technique described in Japanese Patent Application No. 2002-249207, which was filed by the applicant of the present application, can be also used.

In step 208, the registration unit 24 registers, in the image database 18, the input image whose shot location has been identified. Namely, the registration unit 24 stores the input image data in the image data area 34 of the image database 18, and stores the extracted object image data in the representative image data area 36. The registration unit 24 also registers, as management data, the storage address of the image data and the storage address of the object image data. The registration unit 24 also registers the transportation line name, the station name, the shot location coordinates, the peripheral region coordinates and the shooting date, which are other management data, using the same data as the data of the record searched for in step 206 or step 210.

The invention may also be configured so that, when the shot location is identified in step 210 on the basis of the extracted representative object image, the shooting date is estimated and the estimated shooting date is registered as management data. For example, the shooting date can be estimated as follows. First, partial image databases where shooting times and object images are associated may be prepared for each object class (e.g., buildings, human hairstyles, clothing, small articles, etc.), an object image may be extracted from the input image, and the class of the object may be identified. Then, it is determined, per object, whether or not an object image having a high degree of similarity with the extracted object image is present in the partial image database of the identified class, and the shooting time corresponding to the object image with the highest degree of similarity is identified as the shooting time of the input image. Moreover, the invention may also be configured so that the shooting date is inputted when the shooting date is known in advance.

Also, in a case where the shot location could not be identified—i.e., a case where it is determined that the input image was not one shot in any of the areas around the stations on the transportation lines—the routine ends and returns to the main routine without the input image being registered in the image database 18. In this case, the invention may be configured so that the fact that the shot location could not be identified is displayed on the display unit 20.

In this manner, the number of images registered in the image database 18 increases each time an image is inputted.

Next, accumulated image amount display processing in regard to each transportation line will be described with reference to the flow chart shown in FIG. 6.

Figure 8:
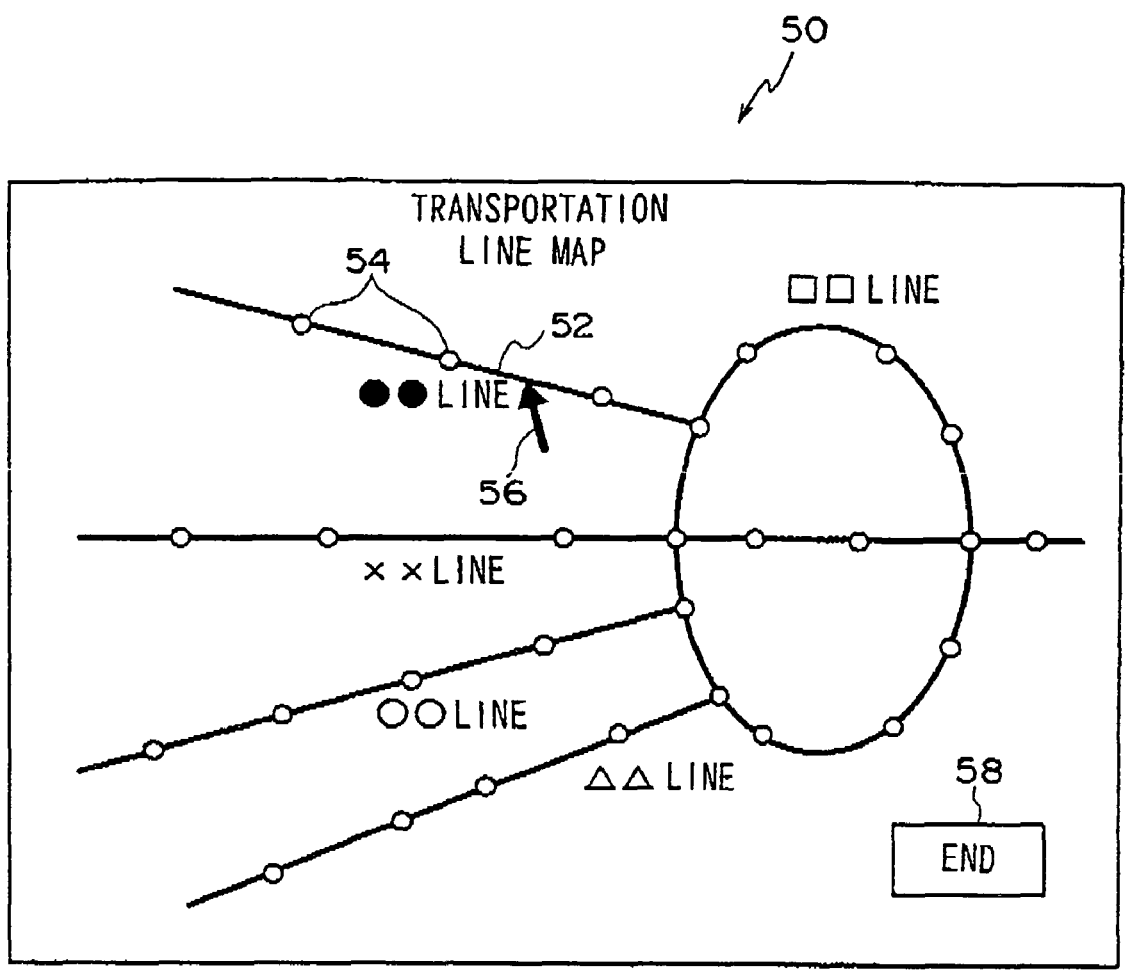
FIG. 8 is a diagram showing an example of a transportation line map display screen according to the embodiment.

First, in step 300, the display image generation unit 30 generates an image of a transportation line map 50 such as shown in FIG. 8, and outputs this to the display unit 20. Thus, the transportation line map 50 is displayed on the display unit 20. The transportation line map 50 is a map in which the positional relation of each transportation line 52, which are display targets of accumulated image amounts, is simplified. Stations 54 present on each transportation line 52 are represented as white circles.

In step 302, it is determined whether or not a transportation line has been selected. When it is determined that a transportation line has not been selected, the routine moves to step 308, where it is determined whether or not the END button 58 has been selected. Here, when it is determined that the END button 58 has been selected, the routine ends and returns to the main routine. When it is determined that the END button 58 has not been selected, the routine returns to step 302.

When the user operates the operation unit 14, moves a cursor 56 to the transportation line 52 whose accumulated image amount the user wants to be displayed and makes a selection (for example clicks on the desired transportation line 52), the routine moves to step 304.

In step 304, the accumulated image amount calculation unit 28 calculates, from the image database 18, the accumulated image amount of each era (e.g., per ten years) in regard to each station on the selected transportation line. This may be done by extracting, from the management data of the image database 18, the record of the transportation line name matching the transportation line name of the selected transportation line, and calculating the accumulated image amount of each era on the basis of the shooting dates in that record.

Figure 9:
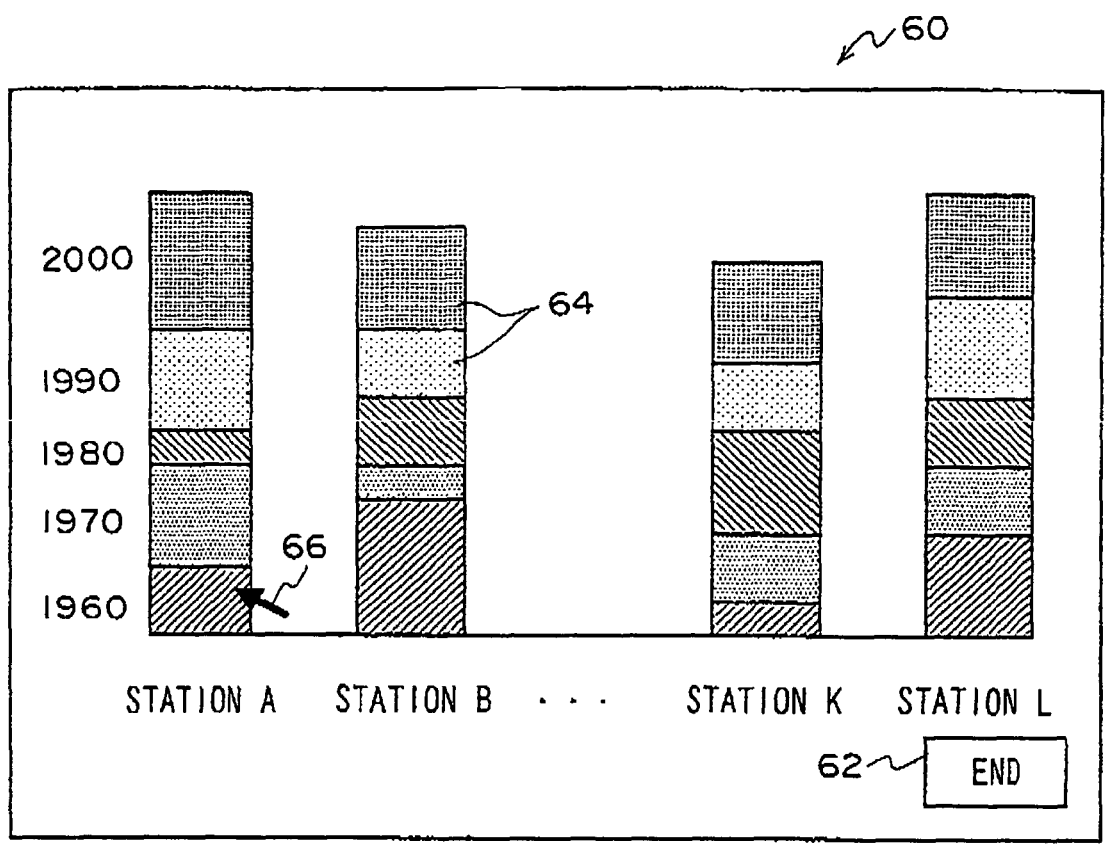
FIG. 9 is a diagram showing an example of an accumulated image amount display screen according to the embodiment.

In step 306, the image display generation unit 30 generates an image of an accumulated image amount display screen 60 such as shown in FIG. 9, on the basis of the calculated accumulated image amount of each era, and outputs this to the display unit 20. Thus, the accumulated image amount display screen 60 is displayed on the display unit 20.

As shown in FIG. 9, the calculated accumulated image amounts of each station per ten years are displayed by a divisional bar graph. The size of the area of divisional regions 64 in the bar graph represents the amount of the accumulated image amounts of those eras. For example, with respect to station B, the accumulated image amounts are large in the order of the 1960s, the 2000s, the 1980s, the 1990s and the 1970s. Thus, the user can intuitively and easily recognize how much the accumulated image amounts of each station in each era are. When an END button 62 is selected on this screen, the display of the accumulated image amount display screen 60 ends.

Figure 10:
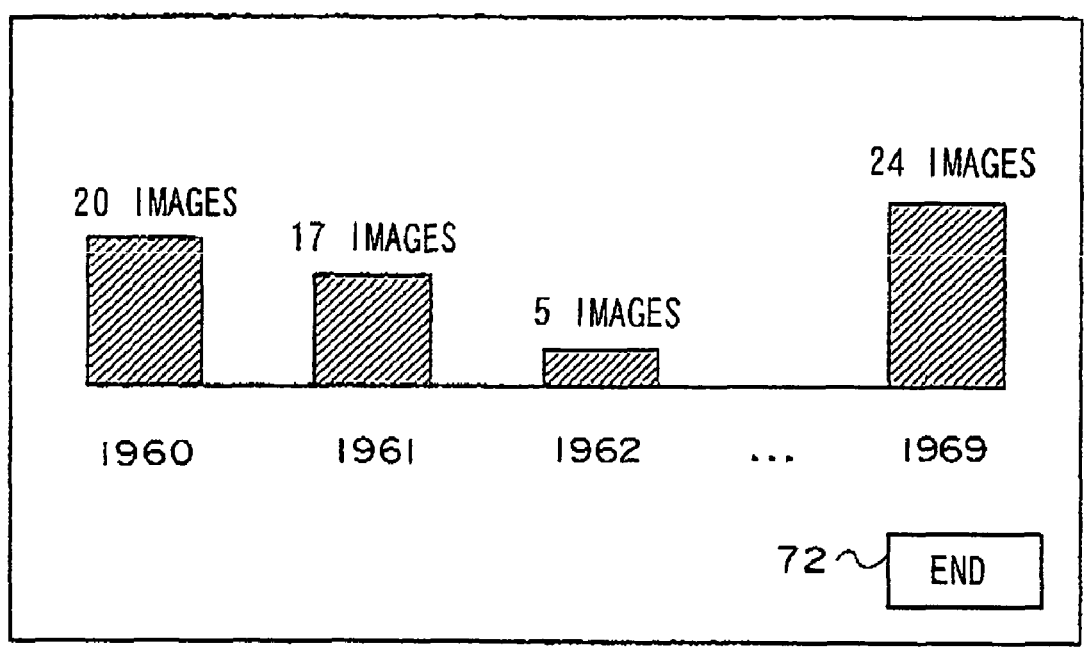
FIG. 10 is a diagram showing an example of a detailed accumulated image amount display screen according to the embodiment.

Also, as shown in FIG. 9, when the user wants more detailed accumulated image amounts of each era to be displayed, the user moves a cursor 66 to the position of the divisional region 64 of the desired era, and selects (clicks) that divisional region 64. In FIG. 9, the cursor 66 is positioned on the position of the 1960s with respect to station A. By conducting this operation, an image of a detailed accumulated image amount display screen 70 such as shown in FIG. 10 is generated by the display image generation unit 30 on the basis of the accumulated image amounts of each year of the selected era, and this image is outputted to the display unit 20. Thus, the detailed accumulated image amount display screen 70 is displayed on the display unit 20.

In the detailed accumulated image amount display screen 70, the accumulated image amounts per year of the selected era are displayed by a bar graph. Thus, the user can easily recognize the accumulated image amounts of each year. As shown in FIG. 10, it is preferable for the class of the hatching in the bar graph to be the same as the hatching of the divisional region 64 selected in the divisional bar graph of FIG. 9. Here, when an END button 72 is selected, the display of the detailed accumulated image amount display screen 70 ends.

The invention may also be configured so that, when the user selects a bar graph of a desired year in a state where the detailed accumulated image amount display screen 70, the user can display and peruse an image where that year is the shooting year.

As described in the preceding embodiment, the image accumulation device of the invention can include: an input unit that inputs, as input images, images of specific shot locations; an image database in which specific locations in a predetermined region, shot images relating to the specific locations, position information of shot locations of the shot images and shooting time information of the shot images are associated and stored; and an identification unit that identifies, on the basis of the input images and the image database, at least one of specific locations corresponding to the shot locations of the input images and shooting times of the input images.

Here, the identification unit identifies, on the basis of the input images inputted by the input unit and the image database, specific locations corresponding to the shot locations of the input images, such as specific locations close to the shot locations, and shooting times of the input images. The shooting time information may be only the information of the year in which the input image was shot or may be information representing a general shooting time, such as a shooting era.

The image accumulation device can further include: a registration unit that associates the input images with at least one of the specific locations and the shooting times identified by the identification unit and registers these in the image database.

Thus, images are accumulated in the image database each time an image is inputted. The image accumulation device can further include: a calculation unit that calculates, for each specific location in the predetermined region, accumulated image amounts of the shot images registered in the image database; a generation unit that generates an accumulated image amount display image showing the accumulated image amounts of ach specific location in the predetermined region calculated by the calculation unit; and an output unit that outputs the accumulated image amount display image.

Incidental information including position information of the shot locations of the input images and shooting time information of the input images can be added to the input images, and the identification unit can identify, on the basis of the image database and the incidental information, the specific locations corresponding to the shot locations of the input images.

In this case, incidental information including shooting time information and position information of the shot locations can be added in advance to the input images, and the identification unit can easily identify the specific locations corresponding to the shot locations of the input images by comparing the position information of the shot locations registered in the image database with the position information of the shot locations included in the incidental information.

The image database can include peripheral region coordinate information representing peripheral regions including the specific locations, and the identification unit can identify, on the basis of the peripheral region coordinate information and the incidental information, the specific locations corresponding to the shot locations of the input images.

In this case, the identification unit identifies, on the basis of the peripheral region coordinate information and the incidental information, the specific locations corresponding to the shot locations of the input images. For example, the identification unit can identify the specific locations corresponding to the shot locations of the input images by comparing the peripheral regions represented by the peripheral region coordinate information with the position information of the shot locations included in the incidental information and determining whether or not the positions represented by the position information are present in the peripheral region. Thus, the identification unit can accumulate, in the image database and as the shot images relating to those specific locations, shot images shot in the peripheral regions of the shot locations.

The image accumulation device may further include an extraction unit that extracts objects included in the input images, wherein the identification unit identifies, on the basis of the result of a comparison between first objects included in the shot images registered in the image database and second objects included in the input images, the specific locations corresponding to the shot locations of the input images.

In this case, the identification unit identifies, on the basis of the result of a comparison between first objects included in the shot images registered in the image database and second objects included in the input images, the specific locations corresponding to the shot locations of the input images. For example, the identification unit can calculate the degree of similarity between the first objects included in the shot images registered in the image database and the second objects included in the input images, and identify, as the specific locations corresponding to the shot locations of the input images, specific locations associated with shot images where the degree of similarity with the second objects included in the input images is the highest. Thus, the identification unit can identify the specific locations corresponding to the shot locations of the input images even when incidental information has not been added to the input images.

The invention may be configured so that the calculation unit calculates, according to era and for each specific location in the predetermined regions, the accumulated image amounts of the shot images registered in the image database, and so that the generation unit generates an accumulated image amount display image showing the accumulated image amount for each specific location in the predetermined regions according to era. Here, by "according to era" means per solid period; this is not limited to period of years but may also be periods of months or days. Thus, the breakdown, according to era, of the accumulated image amount of each specific location in each predetermined region can be easily known.

The image accumulation device may be configured to further include a selection unit that selects, from among plural predetermined regions, a predetermined region whose accumulated image amount display image is to be outputted, wherein the generation unit generates an accumulated image amount display image of the predetermined region selected by the selection unit. Thus, the user can optionally select the predetermined region whose accumulated image amount the user wants to be displayed, so that the convenience of the device can be improved.

The predetermined region may be a region on transportation lines, and specific locations may be at least one of line names and station names of railway lines, and line names and bus stop names of bus lines.

The output unit may include a display unit for displaying the accumulated image amount display image.

The invention may also be configured so that the image database includes image information of predetermined regions, and the output unit outputs an image of the predetermined region map of the predetermined region selected by the selection unit and an accumulated image amount display image of each specific location generated by the generation unit in the vicinity of each station on the predetermined region map. In this case, by displaying the accumulated image amounts in the vicinities of the stations or bus stops on the transportation line map, the accumulated image amount of each station or bus stop can be more intuitively and easily recognized.

The input images can be images shot with cellular phones.

The invention may be configured so that the input unit inputs information read from two-dimensional bar codes in which information relating to the shot locations is recorded, and the identification unit identifies the specific locations corresponding to the shot locations of the input images on the basis of the read information relating to the shot locations.

The invention may also be configured so that the input unit inputs information transmitted via a network relating to the shot locations, and the identification unit identifies the specific locations corresponding to the shot locations of the input images on the basis of the inputted information relating to the shot locations.

The identification unit can include a search unit for searching specific locations corresponding to the shot locations of the input images on the basis of the result of a comparison between the position information of the shot locations included in the incidental information and the peripheral region coordinate information.

The identification unit can further include a rewriting unit which, when the search for the specific locations by the search unit fails, rewrites the peripheral region coordinate information corresponding to the shot locations having the position information closest to the shot locations of the input images, as peripheral region coordinate information which is extended so as to include the shot locations of the input images.

The identification unit may configured to identify the specific locations corresponding to the shot locations having the position information closest to the shot locations of the input images as the specific locations corresponding to the shot locations of the input images.

The identification unit can also include a search unit which calculates a degree of similarity between the first objects and the second objects, searches for specific locations corresponding to the first objects and having a calculated degree of similarity equal to or greater than a predetermined threshold, and, when the search for the specific locations fails, decreases the predetermined threshold gradually within a predetermined range and calculates the degree of similarity for every change of the predetermined threshold to carry out the search.

The identification unit may identify, when the search for the specific locations by the search unit is successful, the specific locations corresponding to the first objects as the specific locations corresponding to the shot locations of the input images, and, when the search for the specific locations by the search unit fails, the specific locations corresponding to the first objects and having the degree of similarity closest to the lower limit of the predetermined range as the shot locations of the input images.

The image accumulation method of the invention can include: receiving, from the outside as input images, images shot of specific shot locations; associating and storing, in an image database, specific locations in a predetermined region, shot images relating to the specific locations, position information of shot locations of the shot images and shooting time information of the shot images; and identifying, on the basis of the input images and the image database, at least one of specific locations corresponding to the shot locations of the input images and shooting times of the input images.

Here, the specific locations corresponding to the shot locations of the input images, such as specific locations close to the shot locations, and shooting times of the input images are identified on the basis of the input images and the image database. The shooting time information may be only the information of the year in which the input image was shot or may be information representing a general shooting time, such as a shooting era.

Also, the input images and the identified specific locations and shooting times may be associated and registered in the image database. Thus, images are accumulated in the image database each time an image is inputted.

The image accumulation method of the invention can further include: calculating, for each specific location in the predetermined region, accumulated image amounts of the shot images registered in the image database; generating an accumulated image amount display image showing the accumulated image amounts calculated for each specific location in the predetermined regions; and outputting the accumulated image amount display image.

Incidental information including position information of the shot locations of the input images and shooting time information of the input images may be added to the input images, and on the basis of the image database and the incidental information, the specific locations corresponding to the shot locations of the input images may be identified.

In this case, incidental information including shooting time information and position information of the shot locations can be added in advance to the input images, and the specific locations corresponding to the shot locations of the input images can be easily identified by comparing the position information of the shot locations registered in the image database with the position information of the shot locations included in the incidental information.

The image database may include peripheral region coordinate information representing peripheral regions including the specific locations, and on the basis of the peripheral region coordinate information and the incidental information, the specific locations corresponding to the shot locations of the input images may be identified.

In this case, the specific locations corresponding to the shot locations of the input images are identified on the basis of the peripheral region coordinate information and the incidental information. For example, the specific locations corresponding to the shot locations of the input images are identified by comparing the peripheral regions represented by the peripheral region coordinate information with the position information of the shot locations included in the incidental information and determining whether or not the positions represented by the position information are present in the peripheral regions. Thus, the shot images shot in the peripheral regions of the specific locations can be accumulated in the image database as shot images relating to those specific locations.

The image accumulation method may further include the step of extracting objects included in the input images, wherein on the basis of the result of a comparison between first objects included in the shot images registered in the image database and second objects included in the input images, the specific locations corresponding to the shot locations of the input images are identified.

For example, the degree of similarity between the fist objects included in the shot images registered in the image database and the second objects included in the input images are calculated, and specific locations associated with shot images where the degree of similarity with the second objects included in the input images is the highest are identified as the specific locations corresponding to the shot locations of the input images. Thus, the specific locations corresponding to the shot locations of the input images are identified even when incidental information has not been added to the input images.

The accumulated image amounts of the shot images registered in the image database can be calculated according to era and for each specific location in the predetermined regions, and an accumulated image amount display image showing the accumulated image amount for each specific location in the predetermined regions according to era can be generated. Here, by "according to era" means per solid period; this is not limited to period of years but may also be periods of months or days. Thus, the breakdown, according to era, of the accumulated image amount of each specific location in each predetermined region can be easily known.

The image accumulation method may further include selecting, from among plural predetermined regions, a predetermined region whose accumulated image amount display image is to be outputted, wherein an accumulated image amount display image of the selected predetermined region selected is generated. Thus, the user can optionally select the predetermined region whose accumulated image amount the user wants to be displayed, so that the convenience of the method can be improved.

Further, the outputting of the image accumulation method may include displaying the accumulated image amount display image.

In this manner, in the present invention, images shot in the areas around railway lines are accumulated, the accumulated image amount of each station is determined in response to a request, and it becomes possible to output this in a manner that is easily recognizable. Thus, images shot of each station from the past to the present can be collectively managed, and it becomes possible for railway companies or the like to use the images for various purposes, such as creating local histories of a region wayside of railway lines or compiling a company history.

In the embodiment of the invention, a case was described where the accumulated image amounts were displayed with a bar graph, but the invention is not limited thereto. Other kinds of graphs, such as a circular graph, may be used as long as the accumulated image amounts can be intuitively and easily recognized, and the divisional regions 64 may be distinguished by color rather than hatching.

Also, the bar graphs do not have to be individually displayed as in the accumulated image amount display screen 60 shown in FIG. 9. The invention may also be configured so that bar graphs corresponding to each station are respectively displayed in the vicinities of the stations 54 of the transportation line map 50 shown in FIG. 8.

In the embodiment of the invention, a case was described where the accumulated image amounts of images shot in areas around each station on railway lines were displayed, but the invention is not limited thereto. For example, the invention is also applicable to a case where accumulated image amounts of images shot in areas around each bus stop of bus lines are displayed.

Further, in the embodiment of the invention, images shot in regard to areas around each station on railway lines are described as the display targets, but the invention is not limited thereto. The range of the targets may be extended to images shot in areas associated with stations, such as sightseeing areas, prefectures, cities, wards, towns or the like including the stations.

Furthermore, in the embodiment of the invention, an image read by a scanner and an image read from a recording medium are exemplified as the images registered in the image database 18, but the invention is not limited thereto. Images shot with cellular phones may be registered in the image database 18.

Moreover, in order to reduce the load of the processing of identifying the shot location when the image shot thereat is registered in the image database 18, information obtained by reading a two-dimensional bar code, in which the shot location and information thereof including the representative object image and the like of the shot location are recorded, may be read together with the shot image and registered in the image database 18 in association with the shot image. The two-dimensional bar codes are printed in advance on, for example, signboards provided at the shot locations together with descriptions, magazines and brochures including articles of the shot locations, and the like.

Alternatively, information relating to the shot location transmitted via a network may be inputted, and registered in the image database 18 in association with the shot image. Specifically, the information relating to the shot location can be obtained via a network by, for example, accessing a web site which provides information of the shot location, or receiving an e-mail message containing information of the shot location, or the like. Further, information printed on a magazine or the like, relating to the shot location, can be inputted manually by a user, and can be also registered in the image database 18 in association with the shot image.

Further, besides the shot images of stations on railway lines or bus stops, the present invention is applicable to any images as long as they are shot at specific locations with which multiple locations are associated in advance. For example, the present invention is applicable to images and the like shot at particular checkpoints on a route including multiple checkpoints as can be seen in a stamp tour (i.e., a tour in which people affix stamps at checkpoints) carried out in orienteering or events, a tour of tourist-attracting cities, towns and villages, and the like. Moreover, these routes may be linked with transportation lines such as railway lines.

Figure 5:
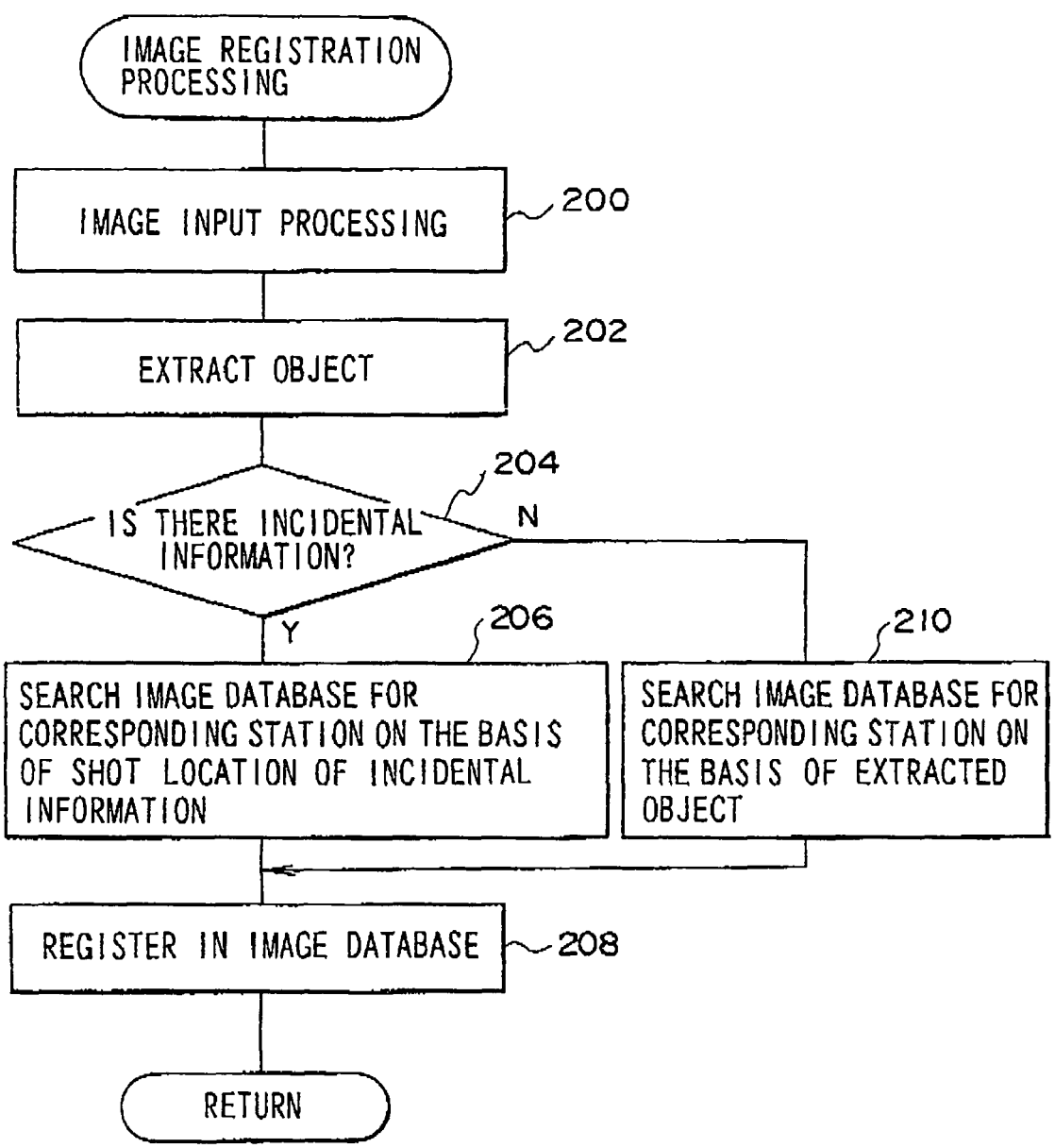
FIG. 5 is a flow chart of an image registration processing routine of the accumulation device of the embodiment.
Figure 6:
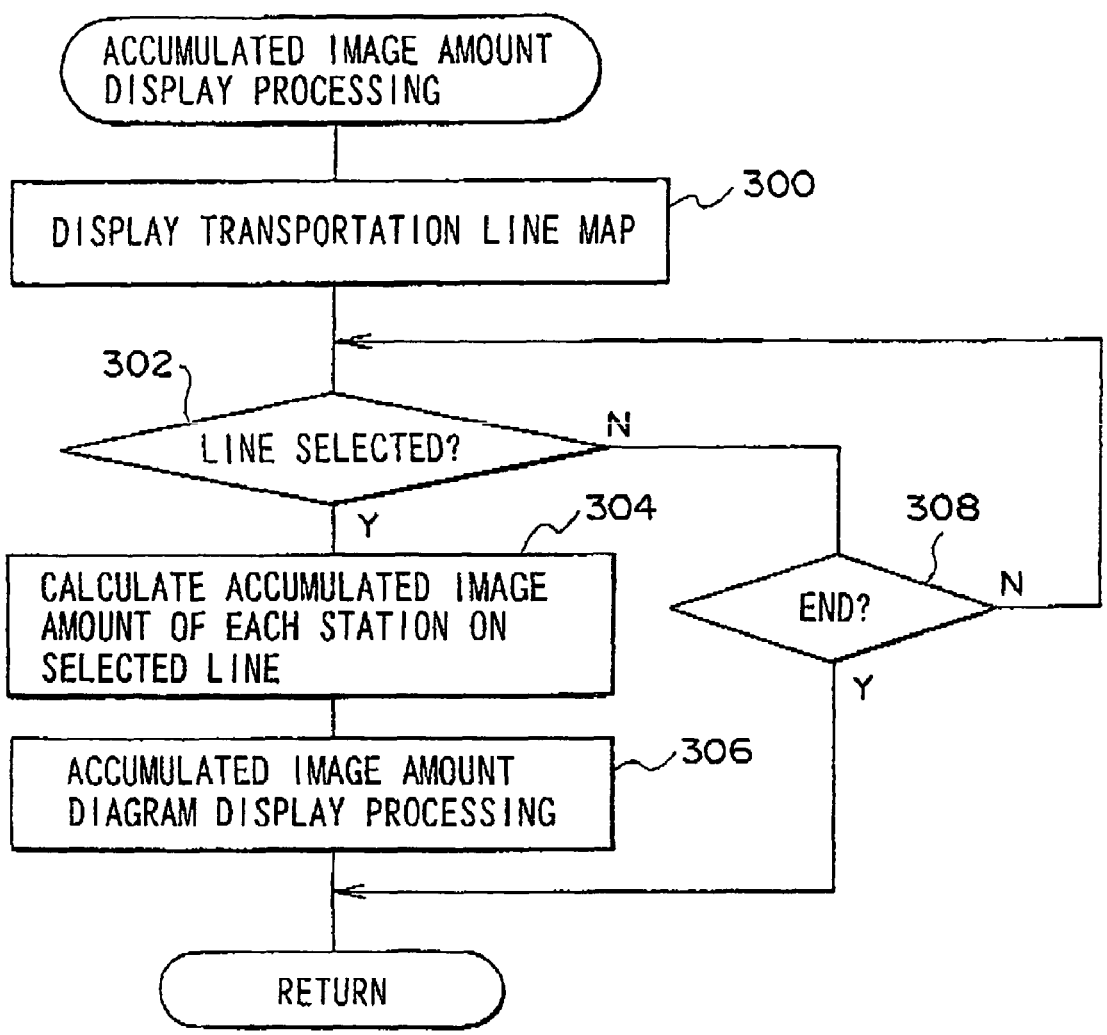
FIG. 6 is a flow chart of an accumulated image amount calculation routine according to the embodiment.

Furthermore, in the embodiment of the invention, a case has been described in which, when the shot location of the input image was not able to be identified, namely, when it is determined in step 206 or step 210 of the routine in FIG. 5 that the input image was not shot in the vicinities of any stations on the transportation lines, the input image is not registered in the image database 18. However, a message indicating that the input image is not registered in the image database 18 may be displayed on the display unit 20. Alternatively, the following processing may be executed.

For example, when a record, in which the shot location included in the incidental information is included in the peripheral region represented by the peripheral region coordinates, is absent in the image database 18 in step 206 of the routine in FIG. 5, a record having the shot location coordinates closest to the shot location included in the incidental information is searched. The peripheral region represented by the peripheral region coordinates of the searched record is extended so as to include the shot location included in the incidental information, and the peripheral region coordinates are rewritten with the extended region being regarded as a new peripheral region. Subsequently, the station corresponding to the shot location of the input image is identified as the station represented by a station name in that record, and the image is registered.

The peripheral region coordinates are preferably set so that no blank regions are generated. With the above processing, the input images are prevented from being unregistered in the image database 18.

Further, in step 210 of FIG. 5, when the record in which the calculated degree of similarity is equal to or greater than the predetermined threshold is absent, the predetermined threshold is gradually decreased within a predetermined range, and the degree of similarity is compared each time the predetermined threshold is decreased. The search is stopped when the calculated degree of similarity becomes equal to or greater than the predetermined threshold. When the degree of similarity does not become equal to or greater than the predetermined threshold even with the lower limit of the predetermined threshold range, the shot location in a record having a degree of similarity closest to the lower limit is identified as the shot location of the input image, and the image is registered.

In either case, a message indicating that the above processing has been executed and the image has been registered may be displayed on the display unit 20. Alternatively, before the processing is executed, a message prompting approval of the user may be displayed on the display unit 20, such that the processing is executed after the approval of the user is obtained.

Further, in the embodiment of the invention, when the shot location is identified in step 210 on the basis of the extracted representative object image, it may be determined, for each object, whether or not an object image having a high degree of similarity with the object image extracted from the input image is present in the partial image database of the identified class, and the shooting time corresponding to the object image with the highest degree of similarity may be identified as the shooting time of the input image. However, the shooting time may be determined in a similar manner to the above identifying processing for the shot location.

Moreover, in the embodiment of the invention, a case has been described in which the accumulated image amounts of each station are displayed by a bar graph in which the accumulated image amounts of respective eras are distinguished by different classes of hatching. Conversely, the accumulated image amounts of each era may be displayed by a bar graph in which the accumulated image amounts of respective stations are distinguished by different classes of hatching.

As described above, according to the present invention, images shot in specific location such as the areas around railway lines are accumulated, the accumulated image amount of each specific location is determined in response to a request, and it becomes possible to output this in a manner that is easily recognizable, whereby images shot of each specific location from the past to the present can be collectively managed, it becomes possible for railway companies or the like to use the images for various purposes, such as creating local histories of a region wayside of railway lines or compiling a company history, and the invention includes excellent effects.

What is claimed is:

1. An image accumulation device comprising:
    an input unit that inputs, as input images, images of shot locations;
    an image database storing specific locations each of which are uniquely associated with a corresponding peripheral region, a plurality of peripheral region coordinate information representing each of the peripheral regions, shot images associated with each specific location, and a plurality of incidental information each being added to one of the input images and including position information of the shot location of the input image and shooting time information of the input image, and data associations associating a single specific location with a single peripheral region in a one-to-one manner, and the shot images with the each specific location; and
    an identification unit that comprises:
        a search unit that searches, on the basis of the peripheral region coordinate information and the incidental information, for a single specific location associated with a peripheral region that includes the shot location of the input image, and the shooting time of the input image, and if the search is successful, the identification unit identifies the single specific location found by the search unit and stores in the database a data association associating the input images with the identified single specific location; and
        a rewriting unit which, when there is no peripheral region that includes the shot location of the input image, selects the peripheral region whose position information is closest to the shot location of the input image, and automatically rewrites the peripheral region coordinate information associated with the selected peripheral region so that the selected peripheral region is extended to include the shot location of the input image.

2. The image accumulation device of claim 1, further comprising:
    a registration unit that associates the input images with at least one of the specific locations and the shooting times identified by the identification unit and registers these in the image database.

3. The image accumulation device of claim 1 further comprising:
    a calculation unit that calculates, for each specific location in the peripheral region, accumulated image amounts of the shot images registered in the image database;
    a generation unit that generates an accumulated image amount display image showing the accumulated image amounts of each specific location in the peripheral region calculated by the calculation unit; and
    an output unit that outputs the accumulated image amount display image.

4. The image accumulation device of claim 3, wherein
    the calculation unit calculates, according to era and for each specific location in the peripheral region, the accumulated image amounts of the shot images registered in the image database, and
    the generation unit generates an accumulated image amount display image showing the accumulated image amount for each specific location in the peripheral region according to era.

5. The image accumulation device of claim 3, further comprising:
    a selection unit that selects, from a plurality of peripheral regions, a peripheral region whose accumulated image amount display image is to be outputted,
    wherein the generation unit generates an accumulated image amount display image of the peripheral region selected by the selection unit.

6. The image accumulation device of claim 5, wherein
    the image database includes image information of region maps of the peripheral regions, and
    the output unit outputs an image of the region map of the peripheral region selected by the selection unit and an accumulated image amount display image of each specific location generated by the generation unit in the vicinity of each station on the region map.

7. The image accumulation device of claim 3, wherein the output unit comprises a display unit for displaying the accumulated image amount display image.

8. The image accumulation device of claim 1, further comprising:
    an extraction unit that extracts objects included in the input images,
    wherein the identification unit identifies, on the basis of the result of a comparison between first objects included in the shot images registered in the image database and second objects included in the input images, the specific locations corresponding to the shot locations of the input images.

9. The image accumulation device of claim 8, wherein the identification unit comprises:
a search unit which calculates a degree of similarity between the first objects and the second objects, searches for specific locations corresponding to the first objects and having a calculated degree of similarity equal to or greater than a predetermined threshold, and, when the search for the specific locations fails, automatically decreases the predetermined threshold gradually within a predetermined range and calculates the degree of similarity for every change of the predetermined threshold to carry out the search.

10. The image accumulation device of claim 8, wherein the identification unit identifies, when the search for the specific locations by the search unit is successful, the specific locations corresponding to the first objects as the specific locations corresponding to the shot locations of the input images, and, when the search for the specific locations by the search unit fails, the specific locations corresponding to the first objects and having the degree of similarity closest to the lower limit of the predetermined range as the shot locations of the input images.

11. The image accumulation device of claim 1, wherein the peripheral region is a region on transportation lines, and the specific locations are at least one of line names and station names of railway lines, and line names and bus stop names of bus lines.

12. The image accumulation device of claim 1, wherein the input images are images shot with cellular phones.

13. The image accumulation device of claim 1, wherein
the input unit inputs information read from two-dimensional bar codes in which information relating to the shot locations is recorded, and
the identification unit identifies the specific locations corresponding to the shot locations of the input images on the basis of the read information relating to the shot locations.

14. The image accumulation device of claim 1, wherein
the input unit inputs information transmitted via a network relating to the shot locations, and
the identification unit identifies the specific locations corresponding to the shot locations of the input images on the basis of the inputted information relating to the shot locations.

15. The image accumulation device of claim 1, wherein with the peripheral region coordinate information, the image database stores the peripheral region coordinate information and shot images to show an evolution of the specific locations over time.

16. An image accumulation method comprising:
receiving, from the outside as input images, images shot of shot locations;
associating and storing, in an image database, specific locations each of which are uniquely associated with a corresponding peripheral region, a plurality of peripheral coordinate information representing each of the peripheral regions, shot images associated with each specific location, and a plurality of incidental information each being added to one of the input images and including position information of the shot location of the input image and shooting time information of the input image, and data associations associating a single specific location with a single peripheral region in a one-to-one manner, and the shot images with the each specific location;
searching, on the basis of the peripheral region coordinate information and the incidental information, for a single specific location associated with a peripheral region that includes the shot location of the input image, and the shooting time of the input image and, if the search is successful, the identifying the single specific location found by the searching and storing in the database a data association associating the input image with the identified single specific location; and
when there is no peripheral region that includes the shot location of the input image, further selecting the peripheral region whose position information is closest to the shot location of the input image, and automatically rewriting the peripheral region coordinate information associated with the selected peripheral region so that the selected peripheral region is extended to include the shot location of the input image.

17. The image accumulation method of claim 16, further comprising:
associating the input images with at least one of the specific locations and the shooting times identified and registering these in the image database.

18. The image accumulation method of claim 16, further comprising:
calculating, for each specific location in the peripheral region, accumulated image amounts of the shot images registered in the image database;
generating an accumulated image amount display image showing the accumulated image amounts calculated for each specific location in the peripheral regions; and
outputting the accumulated image amount display image.

19. The image accumulation method of claim 18, wherein
the accumulated image amounts of the shot images registered in the image database are calculated according to era and for each specific location in the peripheral regions, and
an accumulated image amount display image showing the accumulated image amount for each specific location in the peripheral regions according to era is generated.

20. The image accumulation method of claim 18, further comprising:
selecting, from a plurality of peripheral regions, a peripheral region whose accumulated image amount display image is to be outputted,
wherein an accumulated image amount display image of the selected peripheral region is generated.

21. The image accumulation method of claim 18, wherein the outputting comprises displaying the accumulated image amount display image.

22. The image accumulation method of claim 16, wherein
incidental information including position information of the shot locations of the input images and shooting time information of the input images is added to the input images, and
on the basis of the image database and the incidental information, the specific locations corresponding to the shot locations of the input images are identified.

23. The image accumulation method of claim 22, wherein
the image database includes peripheral region coordinate information representing peripheral regions including the specific locations, and on the basis of the peripheral region coordinate information and the incidental information, the specific locations corresponding to the shot locations of the input images are identified.

24. The image accumulation method of claim 16, further comprising:
extracting objects included in the input images, wherein on the basis of the result of a comparison between first objects included in the shot images registered in the image database and second objects included in the input images, the specific locations corresponding to the shot locations of the input images are identified.

* * * * *